US011917650B2

(12) United States Patent
Sha et al.

(10) Patent No.: US 11,917,650 B2
(45) Date of Patent: Feb. 27, 2024

(54) SYSTEM AND METHOD FOR PERFORMING COMMUNICATIONS IN A MULTI-RAT NETWORK

(71) Applicant: ZTE CORPORATION, Guangdong (CN)

(72) Inventors: Xiubin Sha, Guangdong (CN); Bo Dai, Guangdong (CN); Ting Lu, Guangdong (CN); Xu Liu, Guangdong (CN)

(73) Assignee: ZTE CORPORATION, Guangdong (CN)

(*) Notice: Subject to any disclaimer, the term of this patent is extended or adjusted under 35 U.S.C. 154(b) by 0 days.

(21) Appl. No.: 16/989,341

(22) Filed: Aug. 10, 2020

(65) Prior Publication Data

US 2020/0374838 A1 Nov. 26, 2020

Related U.S. Application Data

(63) Continuation of application No. PCT/CN2018/076631, filed on Feb. 13, 2018.

(51) Int. Cl.
  *H04W 72/00* (2023.01)
  *H04W 72/30* (2023.01)
  *H04W 76/27* (2018.01)
  *H04W 36/00* (2009.01)
  *H04W 4/06* (2009.01)
  *H04W 72/12* (2023.01)

(52) U.S. Cl.
  CPC ........... *H04W 72/30* (2023.01); *H04W 4/06* (2013.01); *H04W 36/0007* (2018.08); *H04W 72/1215* (2013.01); *H04W 74/0833* (2013.01); *H04W 76/27* (2018.02)

(58) Field of Classification Search
  None
  See application file for complete search history.

(56) References Cited

U.S. PATENT DOCUMENTS

| 2003/0139184 A1* | 7/2003 | Singh ................ H04W 36/0066 |
| | | 455/436 |
| 2009/0116418 A1* | 5/2009 | Lee ........................ H04W 72/30 |
| | | 370/312 |
| 2011/0319073 A1* | 12/2011 | Ekici ...................... H04W 48/18 |
| | | 455/553.1 |
| 2012/0230268 A1 | 9/2012 | Marinier |
| 2012/0250548 A1 | 10/2012 | Swaminathan |

(Continued)

FOREIGN PATENT DOCUMENTS

| CN | 103202067 A | 7/2013 |
| CN | 107484216 A | 12/2017 |
| EP | 2477297 A1 | 7/2012 |

*Primary Examiner* — Noel R Beharry
*Assistant Examiner* — Pamit Kaur
(74) *Attorney, Agent, or Firm* — Duane Morris LLP

(57) ABSTRACT

A system and method for allocating network resources are disclosed herein. In one embodiment, the system and method are configured to perform: transmitting a message to a wireless communication device for the wireless communication device to select either a first cell where the wireless communication device currently stays, or a second cell to stay. In some embodiments, the message indicates information about the first cell in which a first radio access technology (RAT) is used and the second cell in which a second RAT, different from the first RAT, is used.

18 Claims, 9 Drawing Sheets

500

(56) References Cited

U.S. PATENT DOCUMENTS

| | | |
|---|---|---|
| 2013/0028069 A1 | 1/2013 | Pelletier |
| 2013/0044709 A1 | 2/2013 | Adjakple |
| 2013/0053035 A1 | 2/2013 | Johansson et al. |
| 2013/0142104 A1 | 6/2013 | Lee et al. |
| 2013/0223409 A1 | 8/2013 | Jung |
| 2013/0303176 A1* | 11/2013 | Martin .................. H04W 76/18 455/450 |
| 2014/0185548 A1* | 7/2014 | Lee ....................... H04W 48/20 370/329 |
| 2016/0286453 A1* | 9/2016 | Roberts ................. H04W 36/24 |
| 2016/0353361 A1 | 12/2016 | Jung et al. |
| 2016/0373978 A1 | 12/2016 | Pakniat et al. |
| 2017/0041900 A1 | 2/2017 | Wallentin et al. |
| 2017/0347296 A1 | 11/2017 | Wu |
| 2018/0132168 A1* | 5/2018 | Ingale ................... H04W 48/20 |
| 2019/0037468 A1* | 1/2019 | Bongaarts ............. H04W 36/32 |
| 2020/0015097 A1* | 1/2020 | Kazmi .................. H04B 17/336 |
| 2020/0029297 A1* | 1/2020 | Baek .................... H04W 68/005 |

\* cited by examiner

SYSTEM AND METHOD FOR PERFORMING COMMUNICATIONS IN A MULTI-RAT NETWORK

TECHNICAL FIELD

The disclosure relates generally to wireless communications and, more particularly, to systems and methods for performing communication in a multi-radio access technology (multi-RAT) network.

BACKGROUND

Wireless communication systems are widely deployed to provide various telecommunication services such as telephony, video, data, messaging, and broadcasts. Typical wireless communication systems (e.g., a user equipment device) may employ multi-radio access technologies to perform communication with multiple users by sharing available system resources (e.g., bandwidth, transmit power). Examples of such multiple-access technologies include a code division multiple access (CDMA) technology, a time division multiple access (TDMA) technology, a frequency division multiple access (FDMA) technology, an orthogonal frequency division multiple access (OFDMA) technology, a single-carrier frequency divisional multiple access (SC-FDMA) technology, a time division synchronous code division multiple access (TD-SCDMA) technology, a global system for mobile communications (GSM) technology, and a long-term evolution (LTE) technology.

As the demand for emerging radio access technologies (e.g., a narrowband internet-of-things (NB-IoT) technology, an enhanced machine-type communication (eMTC) technology, a new radio (NR) technology, etc.) continues to increase, there exists a need for further improvements in terms of performing communication in a network including two or more above-mentioned radio access technologies. Existing wireless communication systems employing the multi-radio access technologies, however, cannot support communications in such a network. Thus, existing wireless communication systems employing the multi-radio access technologies are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a wireless communication node includes: transmitting a message to a wireless communication device for the wireless communication device to select either a first cell where the wireless communication device currently stays, or a second cell to stay. In some embodiments, the message indicates information about the first cell in which a first radio access technology (RAT) is used and the second cell in which a second RAT, different from the first RAT, is used.

In a further embodiment, a method performed by a wireless communication device includes: receiving a message from a wireless communication node. In some embodiments, the message indicates information about a first cell in which a first radio access technology (RAT) is used and a second cell in which a second RAT, different from the first RAT, is used. The method further comprises based on the information, selecting either the first cell where the wireless communication device currently stays, or the second cell to stay.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
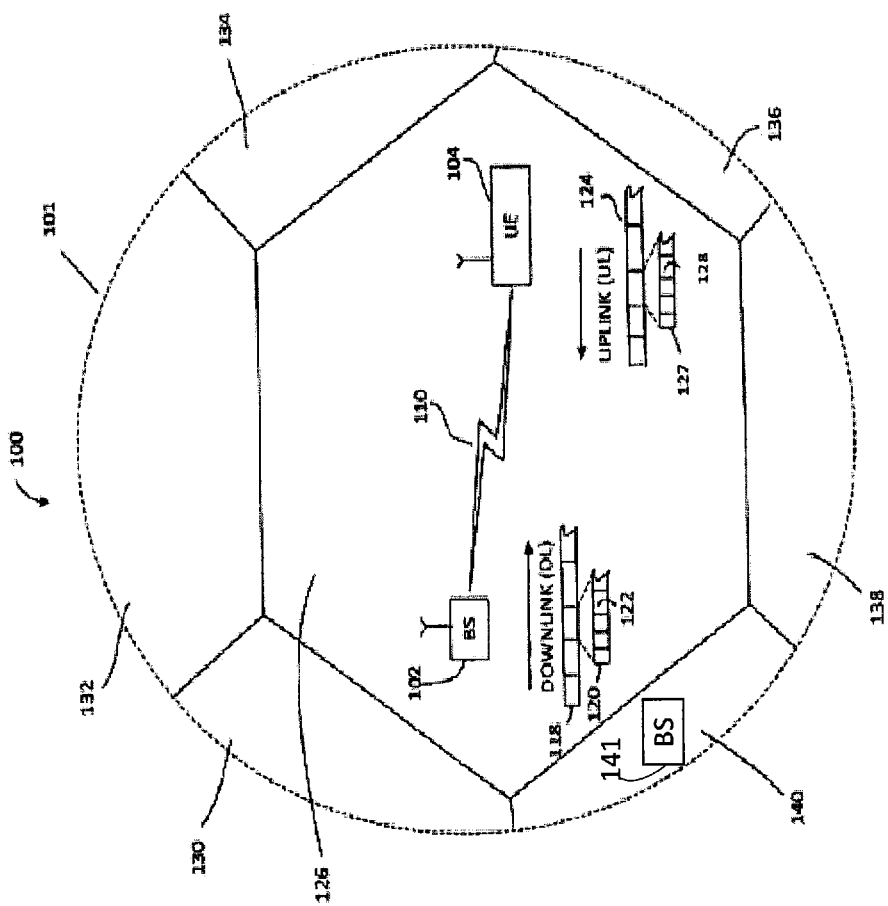
FIG. 1 illustrates an exemplary cellular communication network in which techniques disclosed herein may be implemented, in accordance with an embodiment of the present disclosure.

FIG. 1 illustrates an exemplary wireless communication network, or system, 100 in which techniques disclosed herein may be implemented, in accordance with an embodiment of the present disclosure. Such an exemplary network 100 includes a base station 102 (hereinafter "BS 102") and a user equipment device 104 (hereinafter "UE 104") that can communicate with each other via a communication link 110 (e.g., a wireless communication channel), and a cluster of notional cells 126, 130, 132, 134, 136, 138 and 140 overlaying a geographical area 101.

In FIG. 1, the UE 104 is located within a respective geographic boundary of cell 126 that is defined by the BS 102 (typically referred to as BS 102's cell coverage range). Each of the other cells 130, 132, 134, 136, 138 and 140 that are typically referred to as the cell 126's neighboring cells may include at least one base station operating at its allocated bandwidth to provide adequate radio coverage to its intended users. For example, the neighboring cell 140 may include a BS 141 that defines a respective cell coverage range of the cell 140. Although the respective cell coverage ranges of the cells 126, 130, 132, 134, 136, 138 and 140 do not overlap with one another in the illustrated embodiment of FIG. 1, it is noted that the respective cell coverage ranges of some of the cells 126, 130, 132, 134, 136, 138 and 140 may overlap with one another while remaining within the scope of the present disclosure.

In some embodiments, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the invention.

Figure 2:
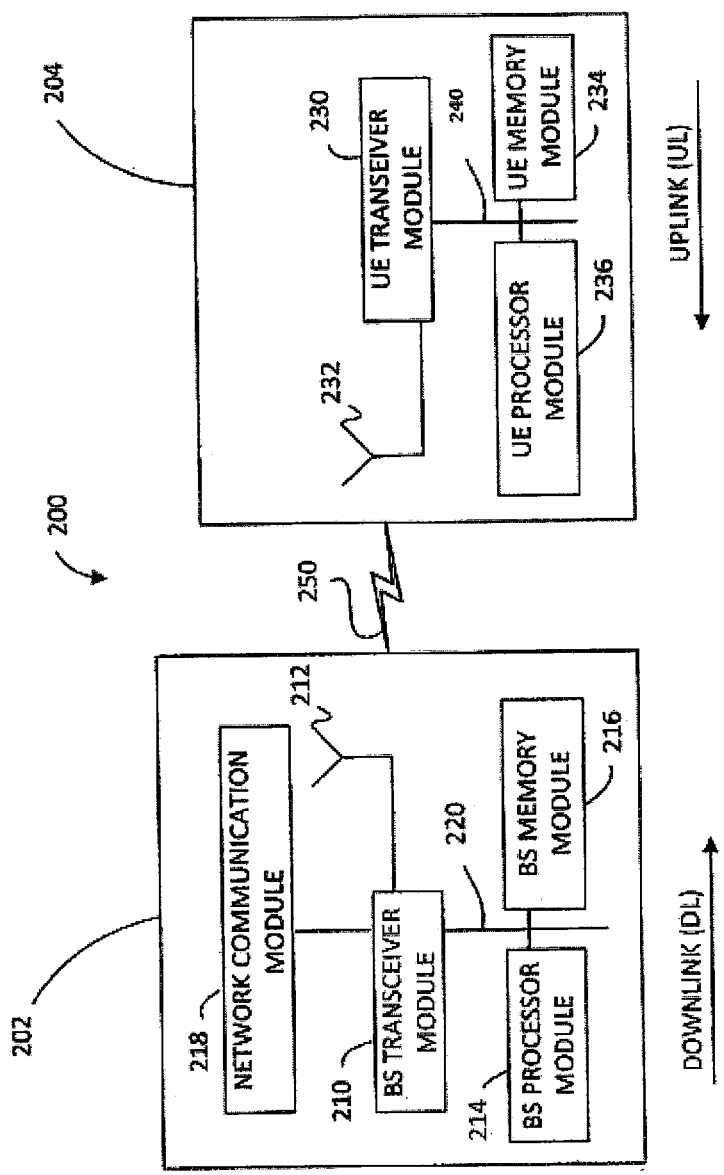
FIG. 2 illustrates block diagrams of an exemplary base station and a user equipment device, in accordance with some embodiments of the present disclosure.

FIG. 2 illustrates a block diagram of an exemplary wireless communication system 200 for transmitting and receiving wireless communication signals, e.g., OFDM/OFDMA signals, in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a date communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver 230 may be referred to herein as an "uplink" transceiver 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceivers 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some exemplary embodiments, the UE transceiver 210 and the base station transceiver 210 are configured to support industry standards such as the Long Term Evolution (LTE) and emerging 5G standards, and the like. It is understood, however, that the invention is not necessarily limited, in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

According to various embodiments of the present disclosure, a wireless communication system/network (e.g., system 100 of FIG. 1) that employs a plurality of radio access technologies (RAT's) is provided. For example, the plurality of RAT's include a global system for mobile communications (GSM) technology, a narrowband Internet-of-Things (NB-IoT) technology, an enhanced machine-type communications (eMTC) technology, a long-term evolution (LTE) technology, a new radio (NR) technology, and any of a variety of developed or currently developing radio access technologies. In some embodiments, the BS(s) contained in each cell (e.g., 126, 130, 132, 134, 136, 138, 140, etc.) of the system 100 uses at least one RAT. However, it is noted that one BS may support two or more RAT's and define two respective cells in which different RAT's are used. For example, the cells 126 and 140 may be both defined by a single BS (either BS 102 or BS 141) but different RAT's are used therein. For purposes of clarity, in the following discussions, the BS(s) that define the respective cells using different RAT's are herein referred to as different BS's, for example, the BS 102 using a first RAT to define the cell 126 and the BS 141 using a second RAT, different from the first RAT, to define the cell 140.

Figure 3:
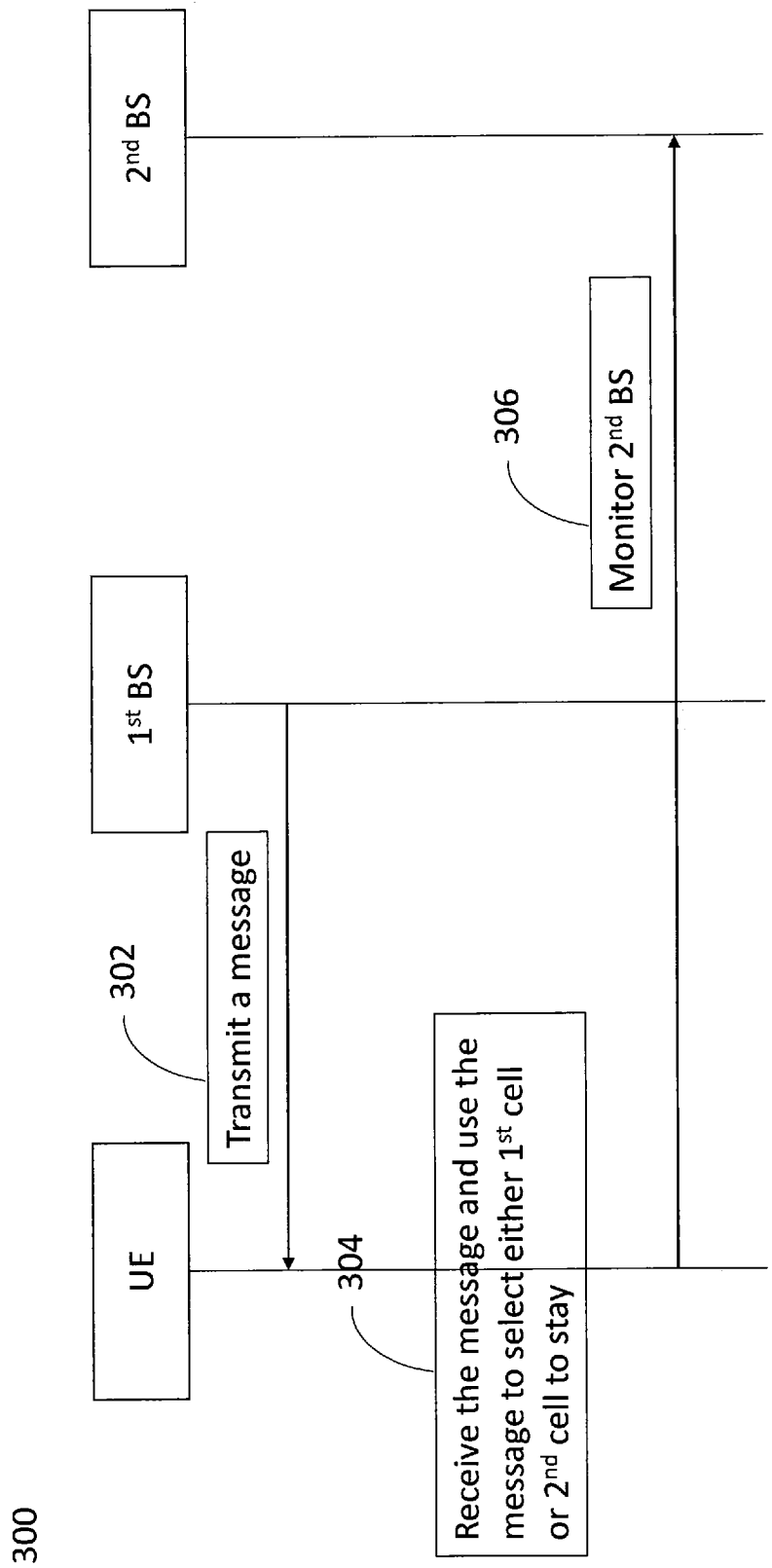
FIG. 3 illustrates a flow chart of an exemplary method collectively performed by a first BS, a second BS, and a UE to perform communication in a multi-RAT (radio access technology) network, in accordance with some embodiments of the present disclosure.

FIG. 3 illustrates an exemplary method 300 collectively performed by a first BS, a second BS, and a UE to perform communication in a multi-RAT network, in accordance with some embodiments of the present disclosure. In various embodiments, the operations of the method 300 are performed by the respective components illustrated in FIGS. 1-2. For purposes of discussion, the following embodiment of the method 300 will be described in conjunction with FIGS. 1-2. The illustrated embodiment of the method 300 is merely an example. Therefore, it should be understood that any of a variety of operations may be omitted, re-sequenced, and/or added while remaining within the scope of the present disclosure.

In some embodiments, the method 300 starts with operation 302 in which the first BS transmits a message to the UE. In some embodiments, a first cell (e.g., 126) is defined by the first BS (e.g., 102) using a first RAT to have a cell coverage range (e.g., the outline of the cell 126 as shown in FIG. 1); and a second cell (e.g., 140) is defined by the second BS (e.g., 141) using a second RAT to have a cell coverage range (e.g., the outline of the cell 140 as shown in FIG. 1). For example, the first RAT may be an NB-IoT technology, and the second RAT may be an LTE technology. In some embodiments, the first cell 126, where the UE 104 currently stays, may be referred to as a "serving cell;" and the second cell 140 may be referred to as a "neighboring cell." Further, in such embodiments, the UE 104 may be in a radio resource connection (RRC) idle mode, typically knows as an "RRC_IDLE mode."

In some embodiments, the message may be broadcasted as a system information block (e.g., a system information block type 2, a system information block type 7, a yet defined system information block type, or the like) through a broadcast channel. In some embodiments, various information can be indicated by such a message, for example, information indicating whether to stay in either the first cell 126 or the second cell 140 based on a coverage mode of the UE 104; information indicating whether to stay in either the first cell 126 or the second cell 140 based on respective measured reference signal received power (RSRP) values in the first cell 126 (typically known as "$Q_{meas,s}$") and the second cell 140 (typically known as "$Q_{meas,n}$") and a predefined offset between the respective RSRP values (typically known as "$Q_{offset,n}$"); information indicating whether to stay in either the first cell 126 or the second cell 140 based on a predefined cell selection priority value (typically known as "cellReselectionPriority" or "cellReslectionSubPriority"); information indicating whether the first and second cells 126 and 140 are associated with at least one equivalent public land mobile network (PLMN) identity (typically known as "equivalent PLMN"); respective PLMN identities associated with the first and second cells 126 and 140; information indicating whether the first cell 126 or second cell 140 is access barred; and scheduling information of multimedia broadcast multicast service (MBMS) and/or single cell point to multipoint (SC-PTM) respectively provided by the first cell 126 and second cell 140 (e.g., respective starting times of the MBMS and/or SC-PTM, the respective RAT's that the MBMS and/or SC-PTM uses, the respective carriers (e.g., frequency locations) that the MBMS and/or SC-PTM uses, etc.).

Next, the method 300 continues to operation 304 in which the UE receives the message and uses the message to select either the first cell or the second cell to stay.

In the above example where the message includes the information for making selection based on the coverage mode of the UE 104, when the UE 104 is in a normal coverage mode, as indicated by the information, the UE 104 may select the cell using the eMTC technology; and when the UE 104 is in an enhanced coverage mode, as indicated by the information, the UE 104 may select the cell using the NB-IoT technology.

In the above example where the message includes the information of equivalent PLMN, when the PLMN identities of the first and second cells 126 and 140 are equivalent, the UE 104 may select the second cell 140. In the above example where the message includes the information of the first cell 126's and second cell 140's respectively associated PLMN identities, the UE 104 may make the selection between the first and second cells 126 and 140 based on whether the UE 104 are previously authorized to access the respective PLMN's as identified by the PLMN identities.

In the above example where the message includes information of $Q_{meas,s}$, $Q_{meas,n}$, and $Q_{offset,n}$, the UE 104 may use a relationship between $Q_{meas,s}$, $Q_{meas,n}$, and $Q_{offset}$ (e.g., whether $Q_{meas,n}$ minus $Q_{offset,n}$ is greater than $Q_{meas,s}$ by a predefined constant, in which $Q_{offset,n}$ can be tunable by the BS 102) to make the selection between the first and second cells 126 and 140. For example, when $Q_{meas,n}$ minus $Q_{offset,n}$ is greater than $Q_{meas,s}$ by the predefined constant, the UE 104 may switch to the second cell 140 to stay.

In the above example where the message includes the information of whether the cell access is barred, when the loading of either the first cell 126 or second cell 140 is above a predefined threshold, the information indicates the cell as "access barred (AB)" or "extended access barred (EAB);" or the information indicates a percentage of each of the loadings of the first cell 126 and second cell 140. As such, the UE 104 may select the cell not indicated as AB or EAB, with a loading percentage not greater than a predefined threshold that is broadcasted by the BS 102, or with a relatively lighter loading.

In the above example where the message includes the scheduling information of MBMS and/or SC-PTM, the UE 104 may use at least one of the respective starting times of the MBMS and/or SC-PTM, the respective RAT's that the MBMS and/or SC-PTM uses, and the respective carriers (e.g., frequency locations) that the MBMS and/or SC-PTM uses to select whether to stay at the first cell 126 or the second cell 140.

In some embodiments, the method 300 continues to optional operation 306 in which the UE monitors the second BS. In some embodiments, the UE 104 may perform such a monitoring in response to the UE 104 selecting to stay at the second cell 141 defined by the second BS 141. For example, the UE 104 may monitor the cell 140 through camping on the cell 140, receiving one or more SIB's broadcasted by the BS 140 within the cell 140, performing RSRP/RSRQ (reference signal received power/reference signal received quality) measurement based on the SIB's broadcasted by the BS 140.

Figure 4:
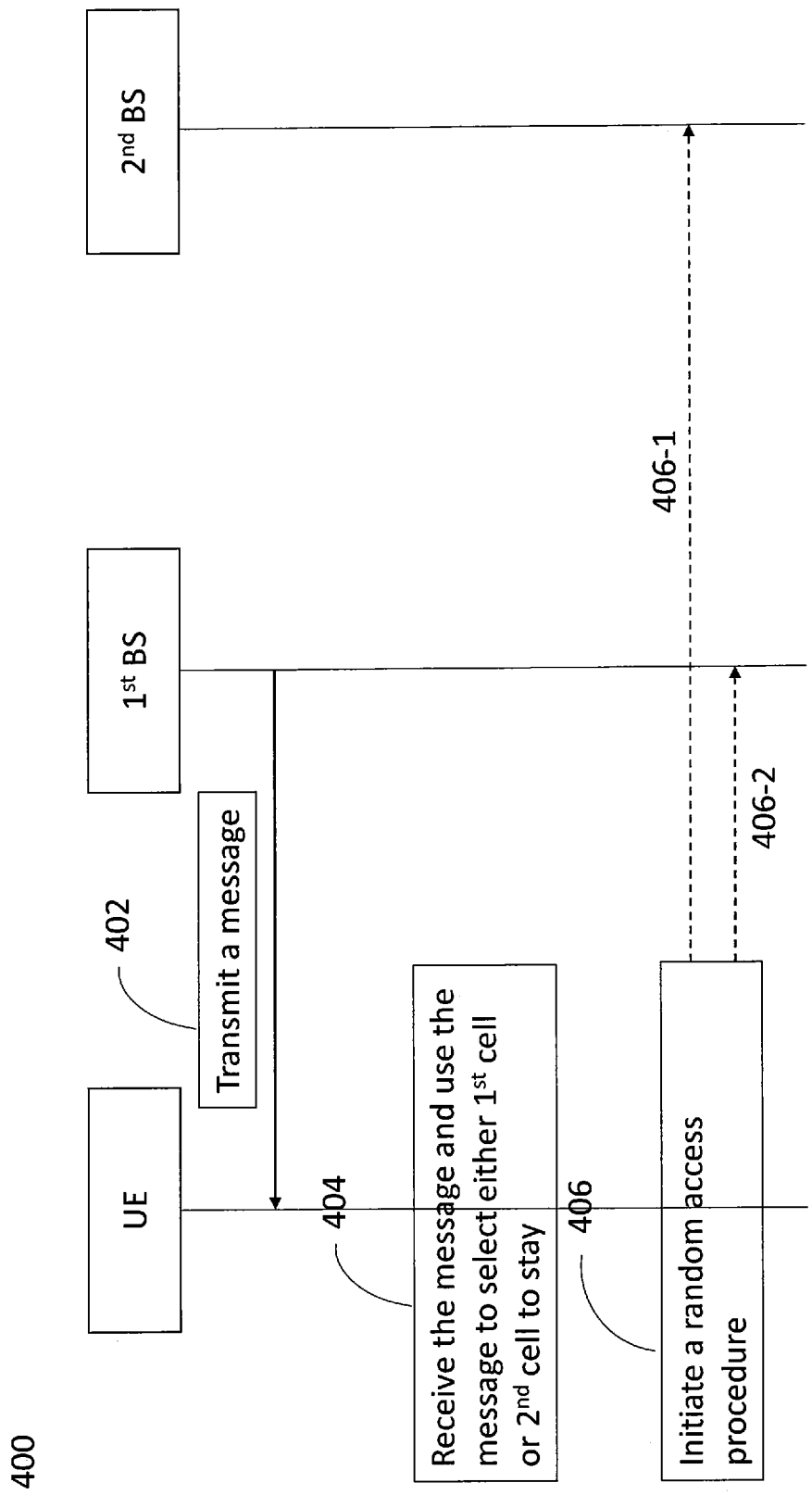
FIG. 4 illustrates a flow chart of another exemplary method collectively performed by a first BS, a second BS, and a UE to perform communication in a multi-RAT network, in accordance with some embodiments of the present disclosure.

FIG. 4 illustrates an exemplary method 400 collectively performed by a first BS, a second BS, and a UE to perform communication in a multi-RAT network, in accordance with some embodiments of the present disclosure. In various embodiments, the operations of the method 400 are performed by the respective components illustrated in FIGS. 1-2. For purposes of discussion, the following embodiment of the method 400 will be described in conjunction with FIGS. 1-2. The illustrated embodiment of the method 400 is merely an example. Therefore, it should be understood that any of a variety of operations may be omitted, re-sequenced, and/or added while remaining within the scope of the present disclosure.

In some embodiments, the method 400 starts with operation 402 in which the first BS transmits a message to the UE. In some embodiments, a first cell (e.g., 126) is defined by the first BS (e.g., 102) using a first RAT to have a cell coverage range (e.g., the outline of the cell 126 as shown in FIG. 1); and a second cell (e.g., 140) is defined by the second BS (e.g., 141) using a second RAT to have a cell coverage range (e.g., the outline of the cell 140 as shown in FIG. 1). For example, the first RAT may be an NB-IoT technology, and the second RAT may be an LTE technology. In some embodiments, the first cell 126, where the UE 104 currently stays, may be referred to as a "serving cell;" and the second cell 140 may be referred to as a "neighboring cell." Further, in such embodiments, the UE 104 may be in a radio resource connection (RRC) connected mode, typically knows as an "RRC_CONNECTED mode."

In some embodiments, the message may be broadcasted as a system information block (e.g., a system information block type 2, a system information block type 7, a yet defined system information block type, or the like) through a broadcast channel. In some embodiments, various information can be indicated by such a message, for example, respective cell coverage ranges of the first and second cells 126 and 140; information indicating a correspondence between a first service that the UE 104 is configured to receive (or trigger) and the first RAT (e.g., a correspondence between a data rate of the first service and the first RAT, a correspondence between the first service and the first RAT, etc.); information indicating a correspondence between a second service that the UE 104 is configured to receive (or trigger) and the second RAT (e.g., a correspondence between a data rate of the second service and the second RAT, a correspondence between the second service and the second RAT, etc.); information indicating a correspondence between a first moving speed of the UE 104 and the first RAT; information indicating a correspondence between a second moving speed of the UE 104 and the second RAT;

information indicating whether the first and second cells 126 and 140 are associated with at least one equivalent public land mobile network (PLMN) identity (typically known as "equivalent PLMN"); information indicating whether the first cell 126 or second cell 140 is access barred; respective timing synchronization information of the first and second cells 126 and 140; a portion of at least one system information block associated with the first cell 126; and a portion of at least one system information block associated with the second cell 140.

Next, the method 400 continues to operation 404 in which the UE receives the message and uses the message to select either the first cell or the second cell to stay.

In the above example where the message includes the information of respective cell coverage ranges of the first and second cells 126 and 140, if the cell coverage ranges of the first and second cells 126 and 140 are substantially similar or the cell coverage range of the second cell 140 includes the cell coverage range of the first cell 126, the UE 104 may select the second cell 140 to stay; and if the cell coverage ranges of the first and second cells 126 and 140 are substantially different or the cell coverage range of the second cell 140 does not include the cell coverage range of the first cell 126, the UE 104 may remain at the first cell 126 or selects another cell using the same RAT as the second cell 140 to stay.

In the above example where the message includes the information of equivalent PLMN, when the PLMN identities of the first and second cells 126 and 140 are equivalent, the UE 104 may select the second cell 140. In the above example where the message includes the information of the first cell 126's and second cell 140's respectively associated PLMN identities, the UE 104 may make the selection between the first and second cells 126 and 140 based on whether the UE 104 are previously authorized to access the respective PLMN's as identified by the PLMN identities.

In the above example where the message includes the information of whether the cell access is barred, when the loading of either the first cell 126 or second cell 140 is above a predefined threshold, the information indicates the cell as "access barred (AB)" or "extended access barred (EAB);" or the information indicates a percentage of each of the loadings of the first cell 126 and second cell 140. As such, the UE 104 may select the cell not indicated as AB or EAB, or with a loading percentage not greater than a predefined threshold.

In the above example where the message includes the information of the respective correspondence between the first service and the first RAT and correspondence between the second service and the second RAT, the UE 104 may rely on such correspondences to make the selection between the first and second cells 126 and 140. In an example, when the data rate of a current service that the UE 104 is configured to receive (or trigger) is less than 16 kbps (kilobits per second) and the size of data that the UE 104 is configured to send is less than 1000 kbyte (kilobyte), per indicated by the correspondences, the UE 104 may select the cell using the NB-IoT technology; when the data rate of the current service that the UE 104 is configured to receive (or trigger) is equal to or greater than 16 kbps and the size of data that the UE 104 is configured to send is equal to or greater than 1000 kbyte, per indicated by the correspondences, the UE 104 may select the cell using the LTE or eMTC technology. In another example, when the UE 104 is to trigger a voice service, since the NB-IoT technology does not support the voice service as indicated by the correspondences, the UE 104 may select the cell using a RAT that supports the voice service, e.g., the LTE or eMTC technology.

In the above example where the message includes the information of correspondences between different moving speeds of the UE 104 and RAT's, the UE 104 may rely on such correspondences to make the selection between the first and second cells 126 and 140. For example, when the moving speed of UE 104 is lower than a predefined threshold, the UE 104 may select the cell using the NB-IoT technology; and when the moving speed of UE 104 is equal to or higher than the predefined threshold, the UE 104 may select the cell using the LTE or eMTC technology.

In some embodiments, subsequently to operation 404, the UE 104 may perform an optional operation in which the UE 104 is indicated to select the cell that uses a RAT different from the first RAT, e.g., the second cell 140. In such an embodiment, the message, sent at operation 402, may be indicative of prioritizing the different RAT over the first RAT, or exclude the first RAT from selection (e.g., directly indicating the second RAT used by the second cell 140). Next, the method 400 continues to operation 406 in which the UE initiates a random access procedure in the selected cell. For example, when, at operation 404, the UE 104 selects the second cell 140 based on the message, received at operation 402, the UE 104 may send a preamble to the BS 141 to initiate a random access procedure, which is illustrated as dotted line 406-1 of FIG. 4. On the other hand, when, at operation 404, the UE 104 selects the first cell 126 based on the message, received at operation 402, the UE 104 may send the preamble to the BS 102 to initiate the random access procedure, which is illustrated as dotted line 406-2 of FIG. 4.

It is noted that in the embodiments where the message includes the information of the respective timing synchronization information of the first and second cells 126 and 140, as discussed above, when the UE 104 selects the second cell 140 and initiate the random access procedure in the second cell 140, the UE 104 may not need to perform a synchronization procedure in the second cell 140. Similarly, in the embodiments where the message includes the portion of at least one system information block associated with the first cell 126 and the portion of at least one system information block associated with the second cell 140, as discussed above, when the UE 104 selects the second cell 140 and initiate the random access procedure in the second cell 140, the UE 104 may not need to decode any system information blocks broadcasted in the second cell 140.

Figure 5:
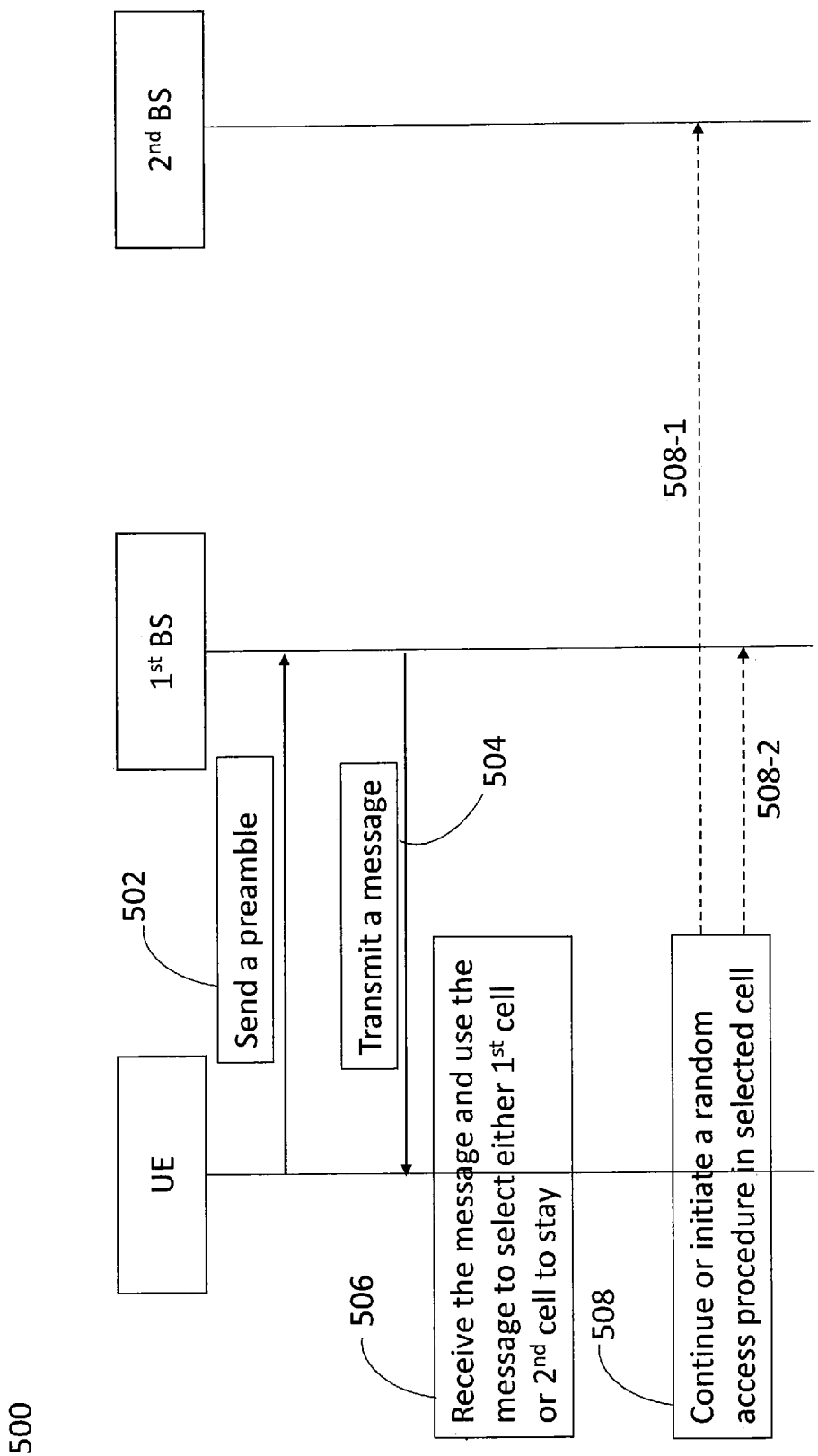
FIG. 5 illustrates a flow chart of yet another exemplary method collectively performed by a first BS, a second BS, and a UE to perform communication in a multi-RAT network, in accordance with some embodiments of the present disclosure.

FIG. 5 illustrates an exemplary method 500 collectively performed by a first BS, a second BS, and a UE to perform communication in a multi-RAT network, in accordance with some embodiments of the present disclosure. In various embodiments, the operations of the method 500 are performed by the respective components illustrated in FIGS. 1-2. For purposes of discussion, the following embodiment of the method 500 will be described in conjunction with FIGS. 1-2. The illustrated embodiment of the method 500 is merely an example. Therefore, it should be understood that any of a variety of operations may be omitted, re-sequenced, and/or added while remaining within the scope of the present disclosure.

In some embodiments, the method 500 starts with operation 502 in which the UE sends a random access preamble (hereinafter "preamble") to the first BS. In some embodiments, a first cell (e.g., 126) is defined by the first BS (e.g., 102) using a first RAT to have a cell coverage range (e.g., the outline of the cell 126 as shown in FIG. 1); and a second cell (e.g., 140) is defined by the second BS (e.g., 141) using a second RAT to have a cell coverage range (e.g., the outline of the cell 140 as shown in FIG. 1). For example, the first RAT may be an NB-IoT technology, and the second RAT may be an LTE technology. In some embodiments, the first cell 126, where the UE 104 currently stays, may be referred to as a "serving cell;" and the second cell 140 may be referred to as a "neighboring cell." Further, in such embodiments, the UE 104 may be in a radio resource connection (RRC) connected mode, typically knows as an "RRC_CONNECTED mode," and configured to initiate a random access procedure in the first (serving) cell 126.

Next, the method 500 continues to operation 504 in which the first BS transmits a message to the UE. In some embodiments, the message may be transmitted, by the first BS 102, as a random access response (RAR) message. In some embodiments, various information can be indicated by such a message, for example, respective frequencies of carriers used by the second RAT that the second cell 140 uses; a cell identity of the second cell 140; and information of the second RAT (e.g., a type of the second RAT). The method 500 then proceeds to operation 506 in which the UE receives the message and uses the message to select either the first cell or the second cell to stay. For example, the UE 104 may select the second cell 140 according to the various information about the second RAT indicated by the RAR message (operation 504); and on the other hand, when no information about the second RAT is indicated by the RAR message, the UE 104 may remain at the first cell 126 to continue the random access procedure, as discussed below.

In some embodiments, the method 500 continues to operation 508 in which the UE continues the random access procedure or initiate another random access procedure in the selected cell. For example, when, at operation 506, the UE 104 selects the second cell 140 based on the message, received at operation 504, the UE 104 may send another preamble to the BS 141 to initiate another random access procedure in the second cell 140 (e.g., sending a preamble to the BS 141), which is illustrated as dotted line 508-1 of FIG. 5. On the other hand, when, at operation 506, the UE 104 remains at the first cell 126 based on the message, received at operation 504, the UE 104 may send subsequent RRC messages (e.g., Msg 3, typically known as a connection request message) to the BS 102 to continue the random access procedure in the first cell 126, which is illustrated as dotted line 508-2 of FIG. 5.

Figure 6:
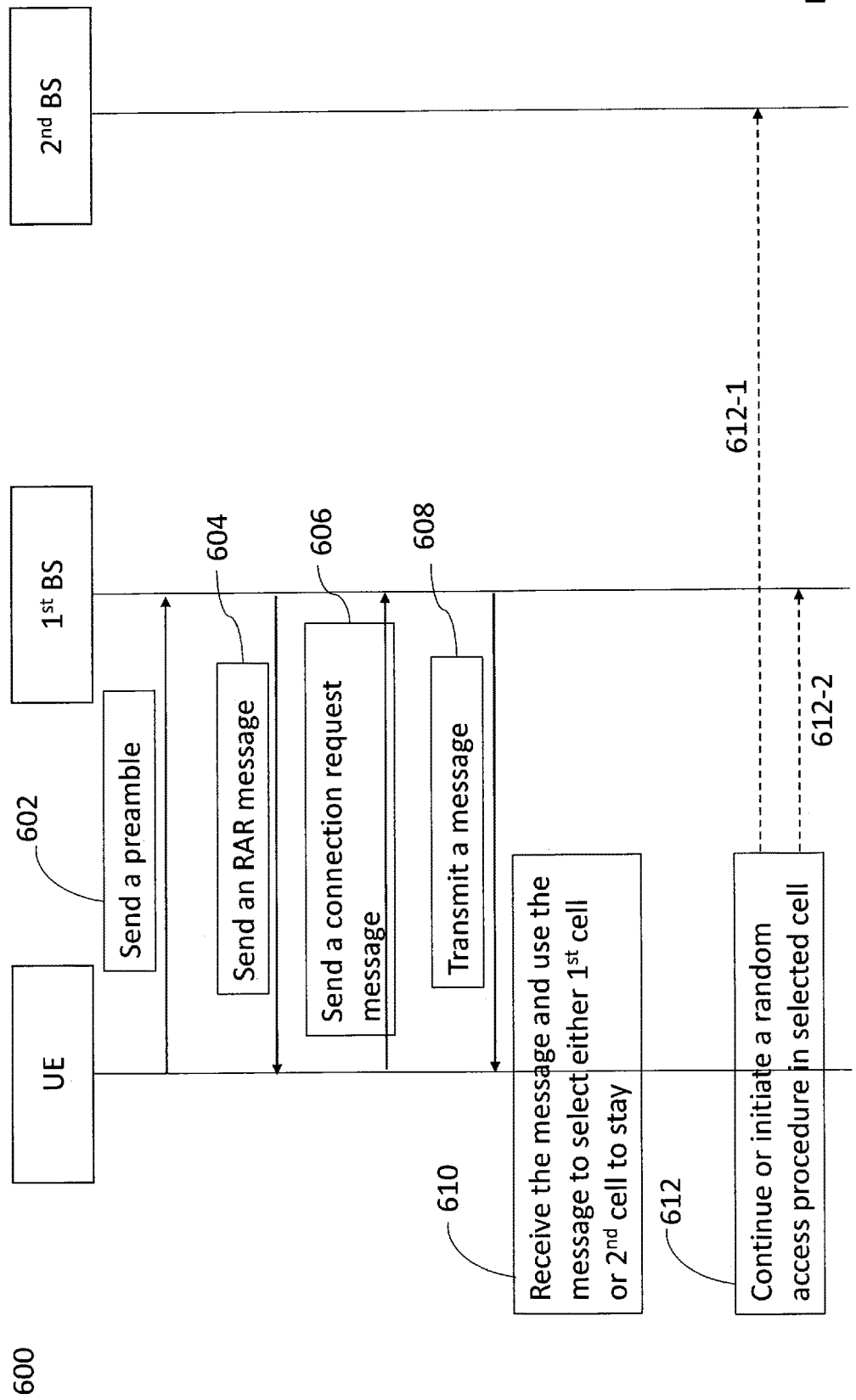
FIG. 6 illustrates a flow chart of yet another exemplary method collectively performed by a first BS, a second BS, and a UE to perform communication in a multi-RAT network, in accordance with some embodiments of the present disclosure.

FIG. 6 illustrates an exemplary method 600 collectively performed by a first BS, a second BS, and a UE to perform communication in a multi-RAT network, in accordance with some embodiments of the present disclosure. In various embodiments, the operations of the method 600 are performed by the respective components illustrated in FIGS. 1-2. For purposes of discussion, the following embodiment of the method 600 will be described in conjunction with FIGS. 1-2. The illustrated embodiment of the method 600 is merely an example. Therefore, it should be understood that any of a variety of operations may be omitted, re-sequenced, and/or added while remaining within the scope of the present disclosure.

In some embodiments, the method 600 starts with operation 602 in which the UE sends a random access preamble (hereinafter "preamble") to the first BS. In some embodiments, a first cell (e.g., 126) is defined by the first BS (e.g., 102) using a first RAT to have a cell coverage range (e.g., the outline of the cell 126 as shown in FIG. 1); and a second cell (e.g., 140) is defined by the second BS (e.g., 141) using a second RAT to have a cell coverage range (e.g., the outline of the cell 140 as shown in FIG. 1). For example, the first RAT may be an NB-IoT technology, and the second RAT may be an LTE technology. In some embodiments, the first cell 126, where the UE 104 currently stays, may be referred to as a "serving cell;" and the second cell 140 may be referred to as a "neighboring cell." Further, in such embodiments, the UE 104 may be in a radio resource connection (RRC) connected mode, typically knows as an "RRC_CONNECTED mode," and configured to initiate a random access procedure in the first (serving) cell 126.

In response to receiving the preamble, the method 600 continues to operation 604 in which the first BS sends a random access response (RAR) message to the UE. In response to receiving the RAR message, the method 600 continues to operation 606 in which the UE sends a connection request message to the first BS.

Next, in some embodiments, the method 600 continues to operation 608 in which the first BS transmits a message to the UE. In some embodiments, the message may be transmitted, by the first BS 102, as one of the following RRC messages: an RRCConnectionResume message, an RRCConnectionSetup message, an RRCEarlyDataComplete message, an RRCConnectionReject message, an RRCConnectionReconfiguration message, an RRCConnectionReestablishment message, and an RRCConnectionRelease message. In some embodiments, various information can be indicated by such a message, for example, scheduling grant information of the second cell 140; respective frequencies of carriers used by the second RAT; a cell identity of the second cell 140; information of the second RAT (e.g., a type of the second RAT); respective timing synchronization information of the first and second cells 126 and 140; a portion of at least one system information block associated with the first cell 126; and a portion of at least one system information block associated with the second cell 140.

The method 600 then proceeds to operation 610 in which the UE receives the message and uses the message to select either the first cell or the second cell to stay. For example, the UE 104 may select the second cell 140 according to the various information about the second RAT indicated by the RRC message (operation 608); and on the other hand, when no information about the second RAT is indicated by the RRC message, the UE 104 may remain at the first cell 126 to continue the random access procedure, as discussed below. In some embodiments, the method 600 continues to operation 612 in which the UE continues the random access procedure or initiate another random access procedure in the selected cell. For example, when, at operation 610, the UE 104 selects the second cell 140 based on the message, received at operation 608, the UE 104 may send another preamble to the BS 141 to initiate another random access procedure in the second cell 140 (e.g., sending a preamble to the BS 141), which is illustrated as dotted line 612-1 of FIG. 6. On the other hand, when, at operation 610, the UE 104 remains at the first cell 126 based on the message, received at operation 608, the UE 104 may send subsequent RRC messages (e.g., Msg 5, typically known as an RRCConnectionSetupComplete message) to the BS 102 to continue the random access procedure in the first cell 126, which is illustrated as dotted line 612-2 of FIG. 6.

It is noted that in the embodiments where the message includes the information of the respective timing synchronization information of the first and second cells 126 and 140, as discussed above, when the UE 104 selects the second cell 140 and initiate the random access procedure in the second cell 140, the UE 104 may not need to perform a synchronization procedure in the second cell 140. Similarly, in the embodiments where the message includes the portion of at least one system information block associated with the first cell 126 and the portion of at least one system information block associated with the second cell 140, as discussed above, when the UE 104 selects the second cell 140 and initiate the random access procedure in the second cell 140, the UE 104 may not need to decode any system information blocks broadcasted in the second cell 140.

Figure 7:
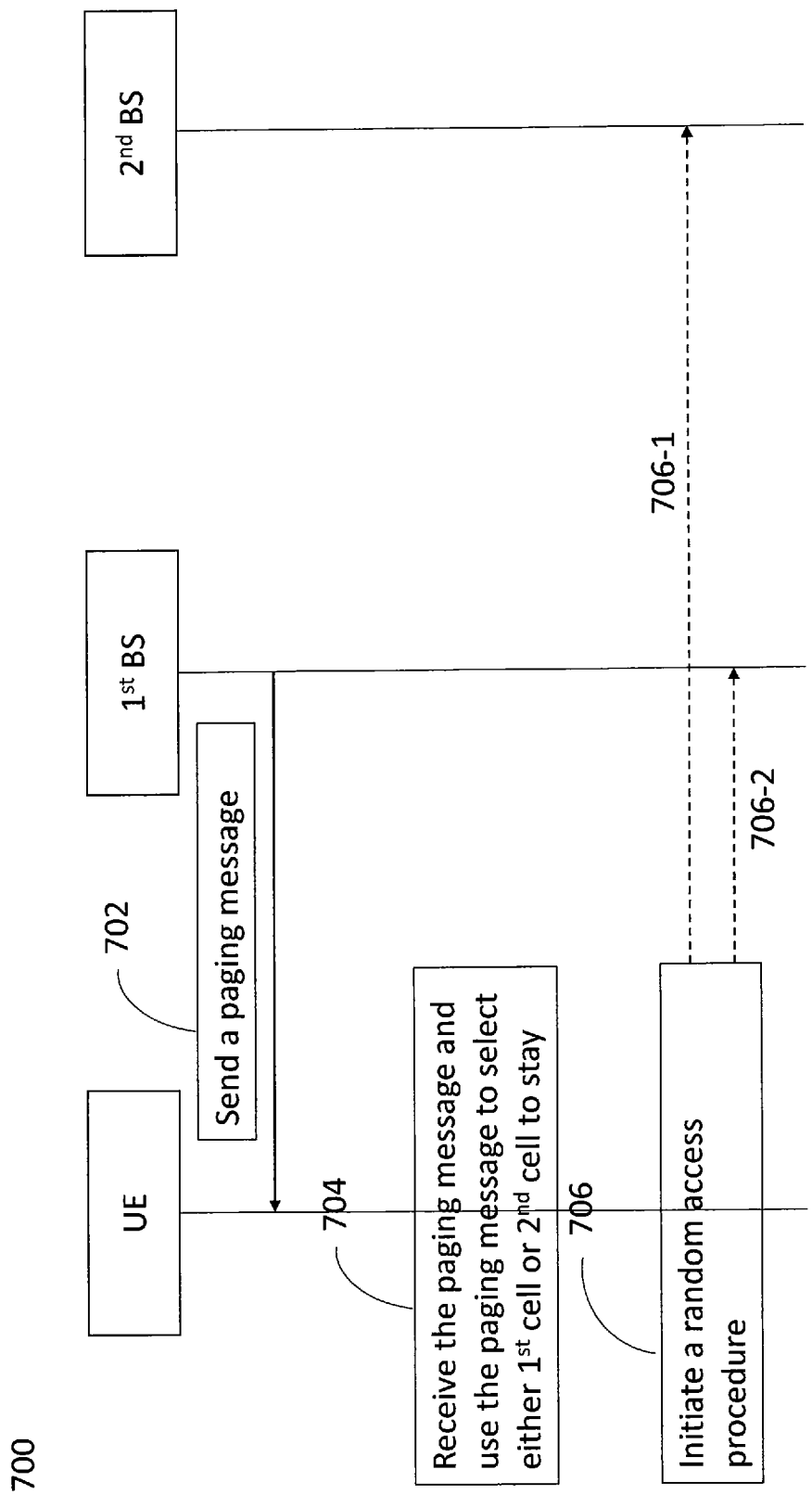
FIG. 7 illustrates a flow chart of yet another exemplary method collectively performed by a first BS, a second BS, and a UE to perform communication in a multi-RAT network, in accordance with some embodiments of the present disclosure.

FIG. 7 illustrates an exemplary method 700 collectively performed by a first BS, a second BS, and a UE to perform communication in a multi-RAT network, in accordance with some embodiments of the present disclosure. In various embodiments, the operations of the method 700 are performed by the respective components illustrated in FIGS. 1-2. For purposes of discussion, the following embodiment of the method 700 will be described in conjunction with FIGS. 1-2. The illustrated embodiment of the method 700 is merely an example. Therefore, it should be understood that any of a variety of operations may be omitted, re-sequenced, and/or added while remaining within the scope of the present disclosure.

In some embodiments, the method 700 starts with operation 702 in which the first BS sends a paging message to the UE. In some embodiments, a first cell (e.g., 126) is defined by the first BS (e.g., 102) using a first RAT to have a cell coverage range (e.g., the outline of the cell 126 as shown in FIG. 1); and a second cell (e.g., 140) is defined by the second BS (e.g., 141) using a second RAT to have a cell coverage range (e.g., the outline of the cell 140 as shown in FIG. 1). For example, the first RAT may be an NB-IoT technology, and the second RAT may be an LTE technology. In some embodiments, the first cell 126, where the UE 104 currently stays, may be referred to as a "serving cell;" and the second cell 140 may be referred to as a "neighboring cell." Further, in such embodiments, the UE 104 may be in a radio resource connection (RRC) idle mode, typically knows as an "RRC_IDLE mode."

In some embodiments, various information can be indicated by such a paging message, for example, respective frequencies of carriers used by the second RAT that the second cell 140 uses; a cell identity of the second cell 140; and information of the second RAT (e.g., a type of the second RAT).

The method 700 then proceeds to operation 704 in which the UE receives the paging message and uses the paging message to select either the first cell or the second cell to stay. For example, the UE 104 may select the second cell 140 according to the various information about the second RAT indicated by the paging message (operation 702); and on the other hand, when no information about the second RAT is indicated by the paging message, the UE 104 may remain at the first cell 126 to initiate a random access procedure, as discussed below. In some embodiments, the method 700 continues to operation 706 in which the UE initiates a random access procedure in the selected cell. For example, when, at operation 704, the UE 104 selects the second cell 140 based on the paging message, received at operation 702, the UE 104 may send a preamble to the BS 141 to initiate a random access procedure in the second cell 140 (e.g., sending a preamble to the BS 141), which is illustrated as dotted line 706-1 of FIG. 7. On the other hand, when, at operation 704, the UE 104 selects the first cell 120 based on the paging message, received at operation 702, the UE 104 may send a preamble to the BS 102 to initiate a random access procedure in the first cell 126 (e.g., sending a preamble to the BS 102), which is illustrated as dotted line 706-2 of FIG. 7.

Figure 8:
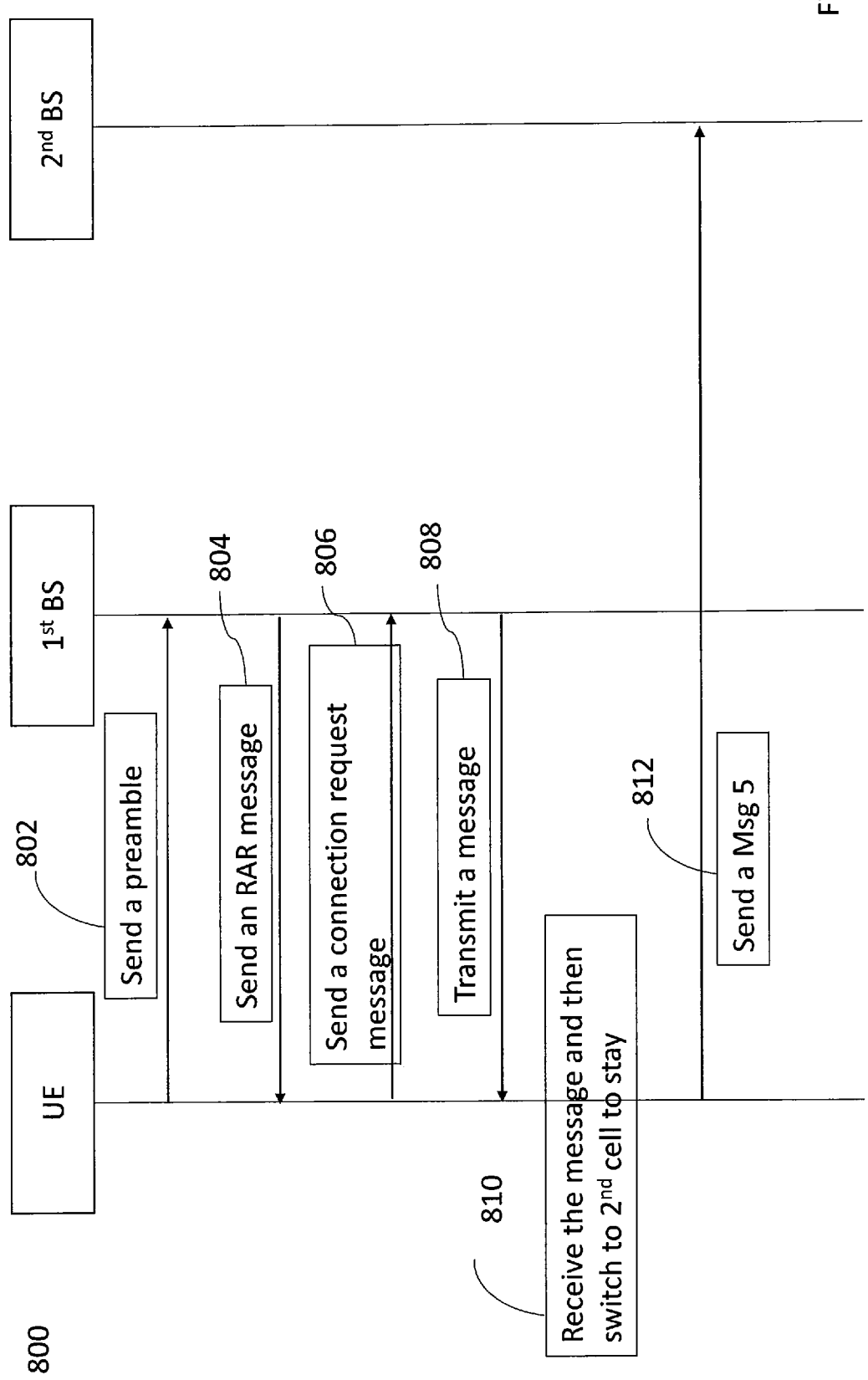
FIG. 8 illustrates a flow chart of yet another exemplary method collectively performed by a first BS, a second BS, and a UE to perform communication in a multi-RAT network, in accordance with some embodiments of the present disclosure.

FIG. 8 illustrates an exemplary method 800 collectively performed by a first BS, a second BS, and a UE to perform communication in a multi-RAT network, in accordance with some embodiments of the present disclosure. In various embodiments, the operations of the method 800 are performed by the respective components illustrated in FIGS. 1-2. For purposes of discussion, the following embodiment of the method 800 will be described in conjunction with FIGS. 1-2. The illustrated embodiment of the method 800 is merely an example. Therefore, it should be understood that any of a variety of operations may be omitted, re-sequenced, and/or added while remaining within the scope of the present disclosure.

In some embodiments, the method 800 starts with operation 802 in which the UE sends a random access preamble (hereinafter "preamble") to the first BS. In some embodiments, a first cell (e.g., 126) is defined by the first BS (e.g., 102) using a first RAT to have a cell coverage range (e.g., the outline of the cell 126 as shown in FIG. 1); and a second cell (e.g., 140) is defined by the second BS (e.g., 141) using a second RAT to have a cell coverage range (e.g., the outline of the cell 140 as shown in FIG. 1). For example, the first RAT may be an NB-IoT technology, and the second RAT may be an LTE technology. In some embodiments, the first cell 126, where the UE 104 currently stays, may be referred to as a "serving cell;" and the second cell 140 may be referred to as a "neighboring cell." Further, in such embodiments, the UE 104 may be in a radio resource connection (RRC) connected mode, typically knows as an "RRC_CONNECTED mode," and configured to initiate a random access procedure in the first (serving) cell 126.

In response to receiving the preamble, the method 800 continues to operation 804 in which the first BS sends a random access response (RAR) message to the UE. In response to receiving the RAR message, the method 800 continues to operation 806 in which the UE sends a connection request message to the first BS.

Next, in some embodiments, the method 800 continues to operation 808 in which the first BS transmits a message to the UE to indicate the UE to switch the second cell to stay. In some embodiments, the message may be transmitted, by the first BS 102, as one of the following RRC messages: an RRCConnectionResume message, an RRCConnectionSetup message, an RRCEarlyDataComplete message, an RRCConnectionReject message, an RRCConnectionReconfiguration message, an RRCConnectionReestablishment message, and an RRCConnectionRelease message. In some embodiments, various information can be indicated by such a message, for example, scheduling grant information of the second cell 140; respective frequencies of carriers used by the second RAT; a cell identity of the second cell 140; information of the second RAT (e.g., a type of the second RAT); respective timing synchronization information of the first and second cells 126 and 140; a portion of at least one system information block associated with the first cell 126; and a portion of at least one system information block associated with the second cell 140.

The method 800 then proceeds to operation 810 in which the UE receives the message and then switches to the second cell to stay. For example, the UE 104 may directly switch to stay at the second cell 140 when the RRC message, transmitted at operation 808, contains the above-described information about the second cell 140. In some embodiments, the UE 104 continues the random access procedure to send subsequent RRC messages (e.g., Msg 5, typically known as an RRCConnectionSetupComplete message) to the BS 141 in the second cell 140, which is illustrated as operation 812 in FIG. 8. For example, when the RRC message transmitted at operation 808 includes the scheduling grant information and the timing synchronization information of the second cell 140, at operation 812, the UE 104 may send Msg 5 using resources indicated by the scheduling grant information.

It is noted that in the embodiments where the message includes the information of the respective timing synchronization information of the first and second cells 126 and 140, as discussed above, when the UE 104 selects the second cell 140 and initiate the random access procedure in the second cell 140, the UE 104 may not need to perform a synchronization procedure in the second cell 140. Similarly, in the embodiments where the message includes the portion of at least one system information block associated with the first cell 126 and the portion of at least one system information block associated with the second cell 140, as discussed above, when the UE 104 selects the second cell 140 and initiate the random access procedure in the second cell 140, the UE 104 may not need to decode any system information blocks broadcasted in the second cell 140. If the message includes the information of the respective timing synchronization information of the first and second cells 126 and 140, and scheduling grant information of the second cell 140, as discussed above, when the UE 104 selects the second cell 140, the UE 104 may not need to perform a random access procedure in the second cell 140 before sending Msg5 in the second cell 140.

Figure 9:
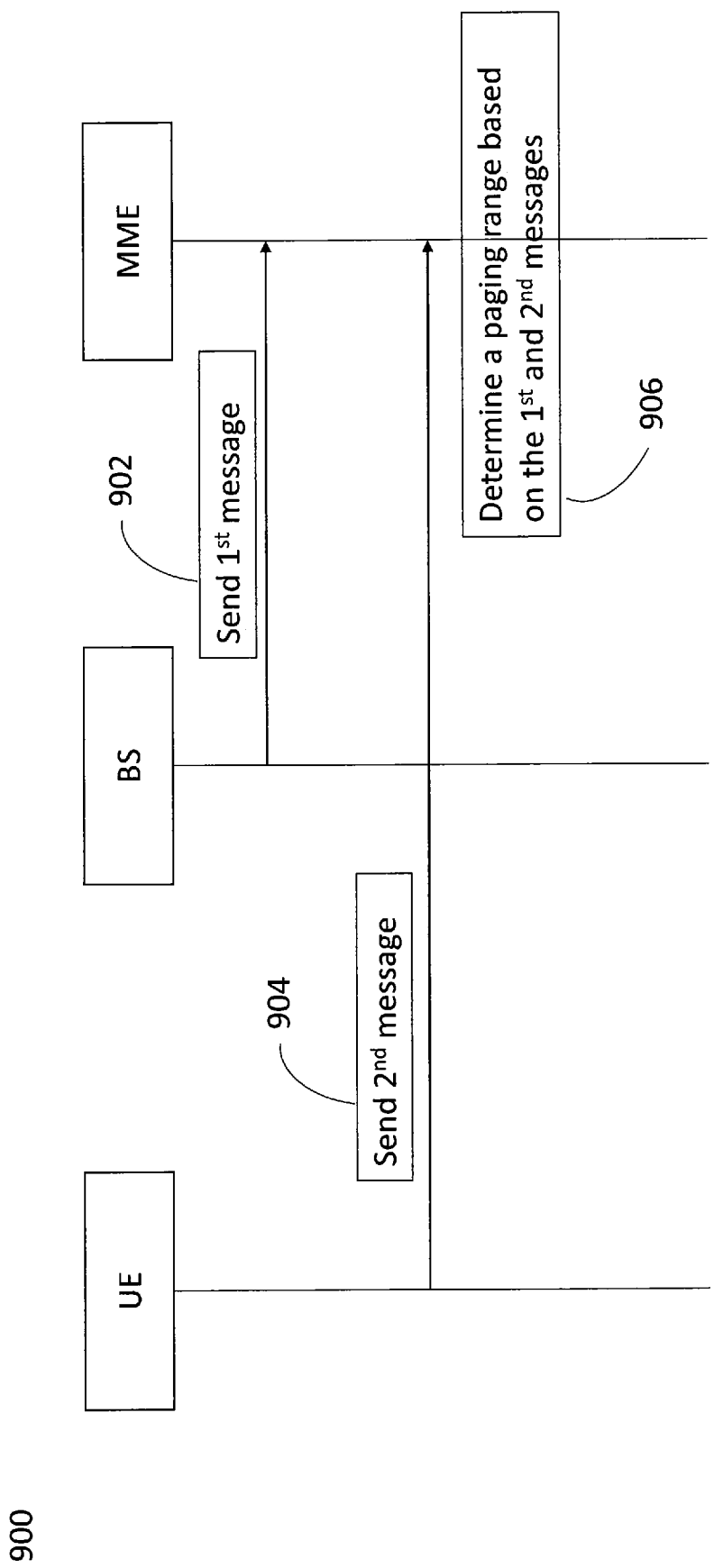
FIG. 9 illustrates a flow chart of an exemplary method collectively performed by a BS, a UE, and a mobile management entity to perform communication in a multi-RAT network, in accordance with some embodiments of the present disclosure.

FIG. 9 illustrates an exemplary method 900 collectively performed by a UE, a BS, and a network entity of a core network (e.g., a mobility management entity (MME)) to perform communication in a multi-RAT network, in accordance with some embodiments of the present disclosure. In various embodiments, the operations of the method 900 are performed by the respective components illustrated in FIGS. 1-2. For purposes of discussion, the following embodiment of the method 900 will be described in conjunction with FIGS. 1-2. The illustrated embodiment of the method 900 is merely an example. Therefore, it should be understood that any of a variety of operations may be omitted, re-sequenced, and/or added while remaining within the scope of the present disclosure.

In some embodiments, the method 900 starts with operation 902 in which the BS sends a first message to the MME. In some embodiments, the BS (e.g., 102) may send the first message, which includes a PLMN identity associated with the cell 126 defined by the BS 102, a tracking area code (TAC) associated with the cell 126, a first RAT that the cell 126 uses, etc., to the MME when the BS 102 establishes or updates a connection between the BS 102 and the MME. The method 900 continues to operation 904 in which the UE sends a second message to the MME. In some embodiments, the UE (e.g., 104) may send the second message, which includes a PLMN identity associated with the cell where the UE 104 is currently located, a tracking area code (TAC) associated with the cell, a second RAT that the cell uses, etc., to the MME when the UE 104 perform an attach procedure or a tracking area update procedure. The method 900 proceeds to operation 906 in which the MME determines a paging range based on the first and second messages. In some embodiments, the first and second RAT's can be different from each other. Although operation 904 is performed subsequently to operation 902 and operation 906 is performed subsequently to operation 904 in the illustrated embodiment of FIG. 9, it is noted that operation 906 does not necessarily occur after operations 902 or 904, and operation 904 does not necessarily occur after operation 902.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller; or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication node, comprising:
    receiving a random access preamble from a wireless communication device which currently camps in a first cell in which a first radio access technology (RAT) is used,
    transmitting a message to the wireless communication device for the wireless communication device to select a second cell to transition to, wherein:
        a second RAT, different from the first RAT, is used in the second cell,
        the message comprises information indicating whether to stay in the first cell or to transition to the second cell based on respective measured reference signal received power (RSRP) values in the first and second cells and a predefined offset between the respective RSRP values, wherein the information comprises:
            scheduling information of a multimedia broadcast multicast service (MBMS) provided by the first and second cells, and
            cell selection criteria information for the wireless communication device, wherein the cell selection criteria information indicates that:
                the wireless communication device selects either the first cell to stay or the second cell to transition to using an enhanced machine-type communication (eMTC) technology when the wireless communication device is in a normal coverage mode, and
                the wireless communication device selects either the first cell to stay or the second cell to transition to using a narrowband internet-of-things (NB-IoT) technology when the wireless communication device is in an enhanced coverage mode.

2. The method of claim 1, wherein the first and second RAT are each selected from a group consisting of: a global system for mobile communications (GSM) technology, the NB-IoT technology, the eMTC technology, a long-term evolution (LTE) technology, and a new radio (NR) technology.

3. The method of claim 1, further comprising:
    transmitting the message through a broadcast channel.

4. The method of claim 3, wherein the information further comprises:
    information indicating whether to stay in either the first cell or the second cell based on a coverage mode of the wireless communication device.

5. The method of claim 4, wherein the wireless communication device is in a radio resource control (RRC) idle mode.

6. The method of claim 3, wherein the information further comprises at least one of:
    respective cell coverage ranges of the first and second cells;
    information indicating a correspondence between a first service that the wireless communication device is configured to receive and the first RAT;
    information indicating a correspondence between a second service that the wireless communication device is configured to receive and the second RAT;
    respective timing synchronization information of the first and second cells;
    a portion of at least one system information block associated with the first cell; or
    a portion of at least one system information block associated with the second cell.

7. The method of claim 6, wherein the wireless communication device is in a radio resource control (RRC) connected mode.

8. The method of claim 1, wherein the information further comprises at least one of:
    respective frequencies of carriers used by the second RAT;
    a cell identity of the second cell; or
    information of the second RAT.

9. The method of claim 1, wherein the information further comprises at least one of:
scheduling grant information to initiate a random access procedure;
respective frequencies of carriers used by the second RAT;
a cell identity of the second cell;
information of the second RAT;
respective timing synchronization information of the first and second cells;
a portion of at least one system information block associated with the first cell; or
a portion of at least one system information block associated with the second cell.

10. A method performed by a wireless communication device, comprising:
receiving a message from a wireless communication node, wherein
the wireless communication device currently camps in a first cell in which a first radio access technology (RAT) is used, and
the message indicates information about a second cell in which a second RAT, different from the first RAT, is used; and
based on the information, selecting either the first cell to stay or the second cell to transition to, wherein the information comprises:
an indication of whether to switch to the second cell
scheduling information of a multimedia broadcast multicast service (MBMS) provided by the first and second cells; and
cell selection criteria information for the wireless communication device, wherein the cell selection criteria information indicates that:
the wireless communication device selects either the first cell to stay or the second cell to transition to using an enhanced machine-type communication (eMTC) technology when the wireless communication device is in a normal coverage mode, and
the wireless communication device selects either the first cell to stay or the second cell to transition to using a narrowband internet-of-things (NB-IoT) technology when the wireless communication device is in an enhanced coverage mode.

11. The method of claim 10, wherein the first and second RAT are each selected from a group consisting of: a global system for mobile communications (GSM) technology, the NB-IoT technology, the eMTC technology, a long-term evolution (LTE) technology, and a new radio (NR) technology.

12. The method of claim 10, further comprising:
receiving the message through a broadcast channel.

13. The method of claim 12, wherein the information further comprises:
information indicating whether to stay in either the first cell or the second cell based on respective measured reference signal received power (RSRP) values in the first and second cells and a predefined offset between the respective RSRP values.

14. The method of claim 13, wherein the wireless communication device is in a radio resource control (RRC) idle mode.

15. The method of claim 12, wherein the information further comprises at least one of:
respective cell coverage ranges of the first and second cells;
information indicating a correspondence between a first service that the wireless communication device is configured to receive and the first RAT;
information indicating a correspondence between a second service that the wireless communication device is configured to receive and the second RAT;
respective timing synchronization information of the first and second cells;
a portion of at least one system information block associated with the first cell; or
a portion of at least one system information block associated with the second cell.

16. The method of claim 15, wherein the wireless communication device is in a radio resource control (RRC) connected mode.

17. The method of claim 15, further comprising:
in response to selecting the second cell to stay, initiating a random access procedure in the second cell.

18. The method of claim 10, further comprising:
after transmitting a random access preamble to the wireless communication node, receiving the message as a random access response (RAR) message from the wireless communication node.

* * * * *